UNITED STATES PATENT OFFICE.

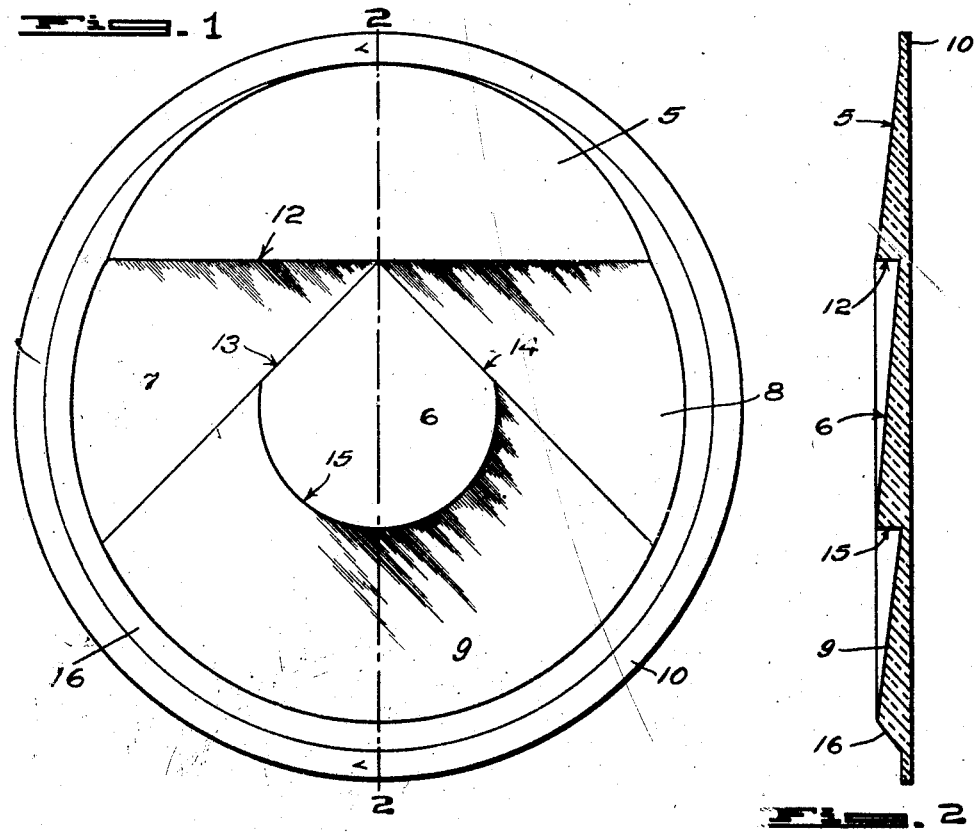
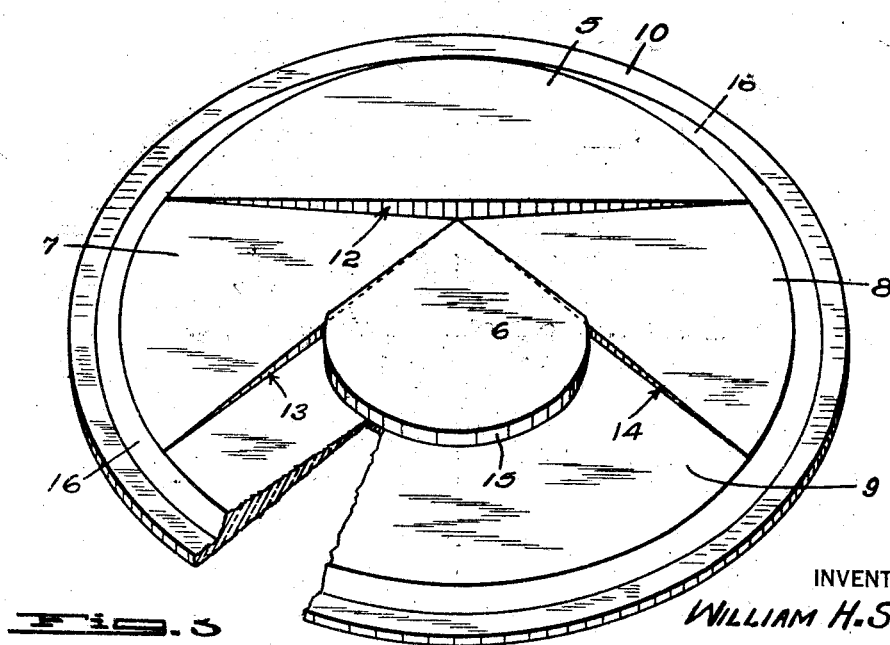

WILLIAM H. SHERROD, OF SEATTLE, WASHINGTON.

HEADLIGHT-LENS.

1,306,780.

Specification of Letters Patent. Patented June 17, 1919.

Application filed June 17, 1918. Serial No. 240,415.

*To all whom it may concern:*

Be it known that I, WILLIAM H. SHERROD, a citizen of the United States, and resident of the city of Seattle, county of King, and State of Washington, have invented certain new and useful Improvements in Headlight-Lenses, of which the following is a clear and exact specification.

This invention relates to improvements in lenses for the head lights of motor vehicles and the object of this improvement is to provide a lens that will eliminate the glare from high-power lamps and that will direct and distribute the light where it will best serve to illuminate the roadway without blinding persons in front of the vehicle.

A further and more specific object is, to provide a lens for motor vehicle headlights that is constructed of a plurality of prism-shaped-segments so arranged and disposed as to direct the rays of light downwardly onto the roadbed in front of a vehicle and outwardly to the sides of the roadbed so that the roadbed directly in front of the vehicle will be illuminated by a strong light, the rays of which are low enough so that they will not strike directly into the eyes of drivers of other vehicles and pedestrians that are looking toward it, and so that the area at the sides of the roadbed will be illuminated sufficiently to permit the driver to see the contour of the ground at the side of the road thereby assisting him to avoid ditches, embankments and like dangerous places.

The invention consists in the novel construction or formation of a prism headlight lens as will be more clearly hereinafter described and claimed.

In the accompanying drawings Figure 1 is a view in elevation of the front or outside surface of a lens constructed in accordance with this invention; Fig. 2 is a view in vertical cross section on broken line 2—2 of Fig. 1, and Fig. 3 is a view in perspective of the front side of the lens as the same might appear when the top of the lens is tilted away from the observer, a certain fragment being broken away to better illustrate the form of construction of the sections for deflecting light sidewise.

One of the chief advantages of this lens is that it makes night driving more safe for the car on which it is installed by casting a light to the sides of the road, thereby enabling the driver to see when he is approaching a dangerous place.

Referring to the drawings, throughout which like reference numerals designate like parts, there is shown a lens that is formed of an upper prism shaped section, 5, a central prism shaped section 6, two side prism shaped sections 7 and 8 and a lower prism shaped section 9.

The several prism shaped sections 5, 6, 7, 8 and 9 are preferably molded from a single piece of glass and are surrounded by an integral circular rim 10 of constant thickness that is of the proper shape and dimensions to adapt the lens to be secured in the hinged frame on the front of any well known standard type of headlight lamp.

The upper section 5 includes the entire upper part of the lens and comprises a segmental portion that extends downwardly across substantially one third of the diameter of the lens and terminates in a shoulder 12 extending horizontally across the lens.

The upper edge of the portion 5 is relatively thin as shown in Fig. 2, while the lower edge thereof is relatively thick, the front side of the lens being in a plane that diverges from the plane of the rear side thereof from top to bottom, thereby forming a prism that serves to deflect light rays downwardly as they pass therethrough.

The side sections 7 and 8 are bounded on their upper edges by the shoulder 12, on their outer edges by the rim 10 and on their lower edges by two shoulders 13 and 14 that intersect each other at the shoulder 12 and on the vertical axis of the lens and each diverge at an angle of substantially forty five degrees from the vertical axis of the lens as more clearly indicated in Fig. 1.

The sections 7 and 8 are each relatively thin at the point where they intersect the vertical axis of the lens and relatively thick at the outer peripheral portions thereof, so that they form prisms having two plane divergent surfaces that deflect the rays of light outwardly from each side of the lens to illuminate the roadsides.

The central section 6 is bounded on its upper portion by the shoulders 13 and 14 and on its lower portion by an arcuate shoulder 15 that is concentric with respect to the lens.

The upper point of the central section 6 is relatively thin while the portion bounded by the arcuate shoulder is relatively thick thereby forming a prism section that tends to deflect the rays of light downwardly as they pass outwardly therethrough.

The lower section 9 is bounded on its top portion by the arcuate shoulder 15, on its side portions by the shoulders 13 and 14 and on its bottom portion by the arcuate rim 10 at the bottom of the lens.

The upper portion of the section 9 adjacent the arcuate shoulder 15 is relatively thin while its lower portion is relatively thick, the front surface thereof being disposed in a plane that diverges from the rear surface of the lens from upper to lower edge, thereby forming a prism that deflects the rays of light downwardly as they pass therethrough.

The outer edges of the sections 5, 7, 8 and 9 are all beveled off as indicated at 16 to give the lens a better finish, where the thicker portions of such sections intersect the rim 10.

From the above description it will be seen that the lens sections 5, 6 and 9 are constructed so that they will deflect the rays of light downwardly onto the road in front of a vehicle while the lens sections 7 and 8 are constructed so that they will deflect a portion of the rays sidewise to illuminate the area at the sides of the road.

This lens may be used with any ordinary automobile headlight lamp and will operate with maximum efficiency when used in connection with a parabolic reflector which will reflect the rays of light parallel with its axis.

This lens is formed entirely of clear transparent glass there being no frosted or ground portions to absorb the rays of light and thus reduce the efficiency of the lamp on which it is used.

If desired this lens may be constructed of a plurality of separable sections and the same results obtained as where it is molded from a single piece of glass.

It is obvious that changes in the precise form of construction of this lens may be resorted to within the scope of the following claims.

What I claim and desire to protect by Letters Patent is—

1. A lens of the class described comprising an upper section of increasing thickness from top to bottom thereof, two triangularly shaped side sections of increasing thickness from the center to side edges of said lens, a central section having an arcuate lower edge of greater thickness than the upper edge thereof and a bottom section of increasing thickness toward the bottom edge thereof.

2. A headlight lens composed of a disk of transparent material comprising an upper section that extends downwardly a distance equal to substantially one third the diameter of said lens and has two plane surfaces that diverge from top to bottom of said section thereby forming a light deflecting prism, two side sections bounded on their top edge by the bottom edge of said upper section and on their bottom edge by two divergent shoulders that intersect the bottom edge of said lower section on the vertical axis of said lens and diverge at an angle of substantially forty five degrees from the vertical axis of said lens, said side sections each having two plane surfaces that diverge toward the side edges of said lens thereby forming a light deflecting prism, a central section having two plane surfaces that diverge from top to bottom thereof thereby forming a light deflecting prism and a lower section comprising two plane surfaces that diverge from top to bottom thereof thereby forming a light deflecting prism.

3. A headlight lens composed of a disk of transparent material comprising an upper section that extends downwardly a distance equal to substantially one third the diameter of said lens and has two plane surfaces that diverge from top to bottom of said section thereby forming a light deflecting prism, two side-sections bounded on their top edge by the bottom edge of said upper section and on their bottom edge by two divergent shoulders that intersect the bottom edge of said lower section on the vertical axis of said lens and diverge at an angle of substantially forty five degrees from the vertical axis of said lens said side sections each having two plane surfaces that diverge toward the side edges of said lens thereby forming a light deflecting prism, a central section that is bounded on its top portion by said two divergent shoulders and on its bottom portion by an arcuate shoulder that is concentric with respect to said lens, said central section having two plane surfaces that diverge toward the bottom thereof thereby forming a light deflecting prism, and a lower section that is bounded on its top edge by said arcuate shoulder and on its side edges by said divergent shoulders, said lower section having two plane surfaces that diverge from top to bottom thereof thereby forming a light deflecting prism.

Signed this 10th day of June, 1918, at Seattle, Washington.

WILLIAM H. SHERROD.